US009470582B2

(12) United States Patent
Hofer et al.

(10) Patent No.: US 9,470,582 B2
(45) Date of Patent: Oct. 18, 2016

(54) TEMPERATURE SENSING CIRCUIT AND METHOD FOR SENSING TEMPERATURE (71) Applicant: Infineon Technologies AG, Neubiberg (DE)

(72) Inventors: Maximilian Hofer, Hartberg (AT); Christoph Boehm, Graz (AT)

(73) Assignee: Infineon Technologies AG, Neubiberg (DE)

( * ) Notice: Subject to any disclaimer, the term of this patent is extended or adjusted under 35 U.S.C. 154(b) by 490 days.

(21) Appl. No.: 14/103,884

(22) Filed: Dec. 12, 2013

(65) Prior Publication Data
US 2015/0168226 A1 Jun. 18, 2015

(51) Int. Cl.
*G01K 7/00* (2006.01)
*G01K 7/01* (2006.01)

(52) U.S. Cl.
CPC ............. *G01K 7/01* (2013.01); *G01K 2217/00* (2013.01)

(58) Field of Classification Search
USPC .................................................. 374/170, 178
See application file for complete search history.

(56) References Cited

U.S. PATENT DOCUMENTS

| 4,243,898 A * | 1/1981 | Seelbach | G01R 17/10 323/313 |
| 5,039,878 A * | 8/1991 | Armstrong | G01K 3/005 323/907 |
| 5,829,879 A * | 11/1998 | Sanchez | G01K 7/01 374/178 |
| 6,002,244 A * | 12/1999 | Wrathall | G01K 7/01 323/315 |
| 6,160,305 A * | 12/2000 | Sanchez | H01L 27/0623 257/467 |
| 7,449,943 B1 * | 11/2008 | Aslan | H04L 25/0278 327/566 |
| 8,177,426 B2 * | 5/2012 | Guo | G01K 7/01 327/512 |
| 2009/0296780 A1 * | 12/2009 | Lee | G01K 7/01 374/178 |
| 2014/0086278 A1 * | 3/2014 | Welland | G01K 7/01 374/183 |

OTHER PUBLICATIONS

M. Hofer, C. Boehm, "An Alternative to Error Correction for SRAM-Like PUFs", Proceeding CHES'10 Proceedings of the 12th international conference on Cryptographic hardware and embedded systems, pp. 335-350, Springer-Verlag Berlin, Heidelberg 2010.
M. Hofer, C. Boehm, W. Pribyl, "Temperature behavior mismatch of halo implanted short channel transistors and its influence on PUF circuits", 13th International Symposium on Integrated Circuits (ISIC), 2011, pp. 352-355.

* cited by examiner

*Primary Examiner* — Mirellys Jagan
(74) *Attorney, Agent, or Firm* — Viering, Jentschura & Partner mbB (57) ABSTRACT According to one embodiment, a temperature sensing circuit is described comprising a multiplicity of transistor circuits having a multiplicity of different temperature characteristics and a circuit configured to determine a plurality of mismatch values comprising, for each transistor circuit, a mismatch value representing the temperature characteristic of the transistor circuit and to determine a temperature value using the determined plurality of mismatch values.

19 Claims, 13 Drawing Sheets

TEMPERATURE SENSING CIRCUIT AND METHOD FOR SENSING TEMPERATURE

TECHNICAL FIELD

Various embodiments relate generally to Temperature sensing circuits and methods for sensing temperature.

BACKGROUND

For various applications, it may be desirable to measure temperature. This may for example be done by measuring the PTAT (proportional to absolute temperature) voltage of a bipolar diode at a constant current. However, for example on a semiconductor chip, additional circuitry is typically needed to implement such a kind of temperature measurement. Accordingly, efficient approaches for temperature measurement are desirable.

SUMMARY

According to one embodiment, a temperature sensing circuit is provided including a multiplicity of transistor circuits having a multiplicity of different temperature characteristics and a circuit configured to determine a plurality of mismatch values including, for each transistor circuit, a mismatch value representing the temperature characteristic of the transistor circuit and to determine a temperature value using the determined plurality of mismatch values.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
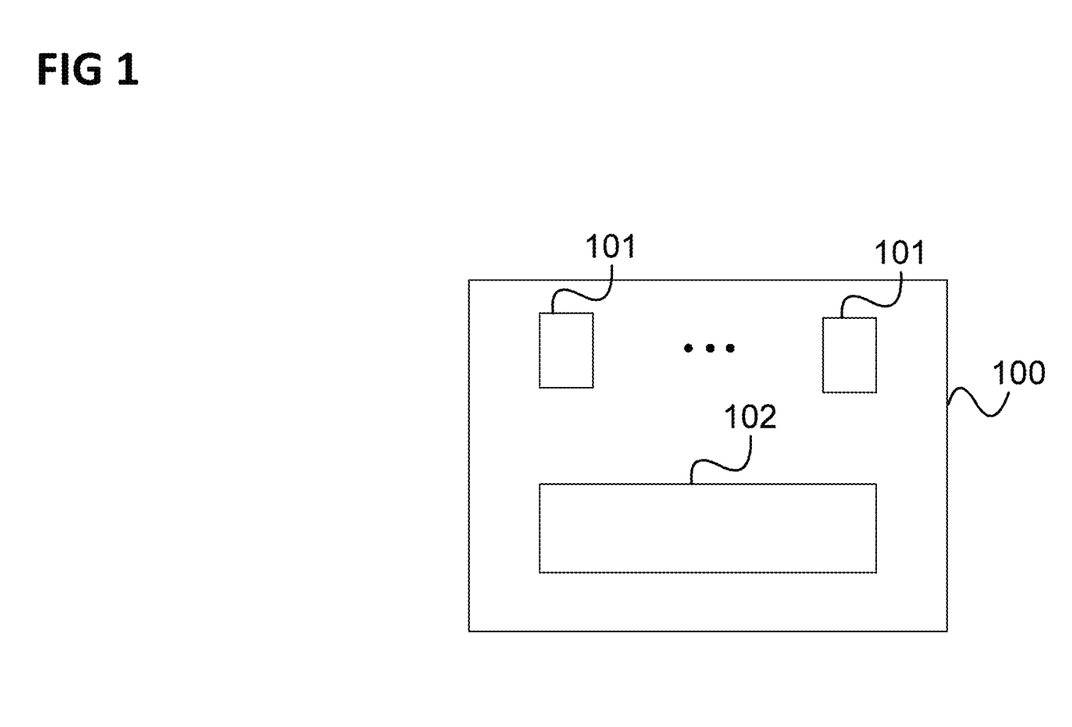
FIG. 1 shows a temperature sensing circuit according to an embodiment.

FIG. 1 shows a temperature sensing circuit 100 according to an embodiment.

The temperature sensing circuit 100 includes a multiplicity of transistor circuits 101 having a multiplicity of different temperature characteristics.

Further, the temperature sensing circuit 100 includes a circuit 102 configured to determine a plurality of mismatch values including, for each transistor circuit, a mismatch value representing the temperature characteristic of the transistor circuit and to determine a temperature value using the determined plurality of mismatch values.

According to one embodiment, in other words, the different dependency of a multiplicity of transistor circuits on temperature is used to derive information about the temperature. For example, the startup values of a multiplicity of bi-stable transistor circuits may depend on the temperature differently for the bi-stable transistor circuits such that in effect, temperature can be measured based on the startup values, in other words the startup value vector, of the multiplicity of bi-stable transistor circuits (wherein the startup value vector has a component for each bi-stable transistor circuit corresponding to the startup value of the bi-stable transistor circuit).

On a semiconductor chip, this may be implemented using existing circuitry. For example, in case bi-stable transistor circuits such as SRAM (static random access memory) cells are already present on the chip these can be used for a temperature sensor without large effort.

In one embodiment, for example, the Hamming distance (HD) of the startup value vector to a reference startup value vector (e.g. generated at a reference temperature) of a multiplicity of bistable circuits is determined at different temperatures. For example, the startup values of a number of bi-stable circuits are measured at an initial temperature (to generate a first startup value vector) and at a different (e.g. higher) temperature the startup values of the bi-stable circuits are re-measured (to generate a second startup value vector). Both startup value vectors values are stored, for example in a non-volatile memory. Depending on the temperature coefficient mismatch of the bistable circuits the startup values of the bistable circuits are different from the stored startup value vectors at different temperatures. For example, the startup value of one of the first bi-stable circuits is equal to the corresponding component of the first startup value vector up to a first temperature, while the startup value of another of the first bi-stable circuits is already equal to the corresponding component of the second startup value vector at a second temperature below the first temperature. Assuming that the number of startup values differing from the first startup value vector is linear with respect to the temperature delta, i.e. the difference of the current temperature to the initial temperature, the current temperature may be determined based on the startup vector at the current temperature. This approach may be for example realized in CMOS technology.

According to one embodiment, at least one of the multiplicity of transistor circuits includes a bi-stable transistor circuit.

For example, at least one of the multiplicity of transistor circuits includes a static random access memory cell.

The temperature characteristic of a transistor circuit is for example the dependency of a start state of the transistor circuit from temperature.

According to one embodiment, the mismatch value of a transistor circuit is a start state of the transistor circuit.

Each mismatch value is for example a digital value, e.g. 0 or 1 (or, equivalently, low and high etc.).

According to one embodiment, each transistor circuit includes two transistors and the mismatch value for the transistor circuit represents a mismatch of the temperature dependency of the transistors.

The transistors are for example field effect transistors (e.g. MOSFETs).

The temperature dependency of a transistor is for example the dependency of the threshold voltage of the transistors from temperature.

Figure 5:
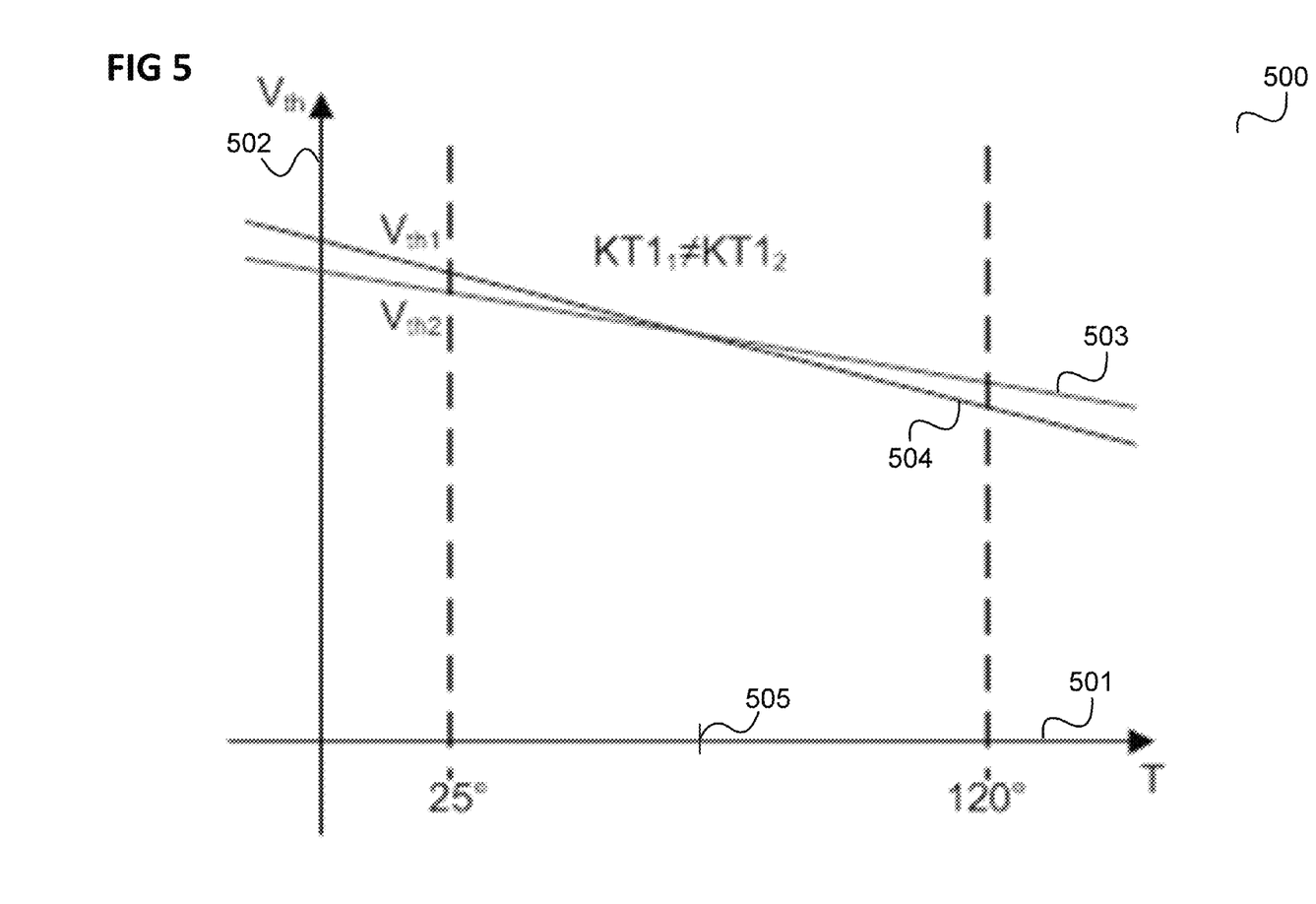
FIG. 5 shows a diagram illustrating the dependency of the threshold voltage for two field effect transistors.

According to one embodiment, at least one transistor circuit of the multiplicity of transistor circuits has transistors whose temperature dependencies cross each other (as for example illustrated in FIG. 5).

According to one embodiment, at least one transistor circuit of the multiplicity of transistor circuits includes a main transistor circuit having an operating point and at least one additional transistor switchably connectable to the main transistor circuit, which is configured to move the operating point when connected to the main transistor circuit, to thereby increase the probability of providing a crossing point of the temperature dependencies of the transistors of the transistor circuit.

According to one embodiment, the at least one additional transistor is switchably connectable in parallel to the main transistor circuit.

The temperature sensing circuit may further include a memory storing one or more further pluralities of mismatch values, wherein each plurality of mismatch values includes, for each transistor circuit, a mismatch value representing a temperature characteristic of the transistor circuit wherein the circuit is configured to determine the temperature value using the one or more further pluralities of mismatch values.

According to one embodiment, the temperature sensing circuit includes a memory storing one or more further pluralities of mismatch values, wherein each further plurality of mismatch values corresponds to a predetermined temperature and each further plurality of mismatch values includes, for each transistor circuit, a start state of the transistor circuit at the temperature to which the further plurality of mismatch values corresponds wherein the circuit is configured to determine the temperature value using the one or more further pluralities of mismatch values.

According to one embodiment, the circuit is configured to determine the temperature value by comparing the plurality of mismatch values with the one or more further pluralities of mismatch values.

For example, each mismatch value is 0 or 1 and the circuit is configured to compare the plurality of mismatch values with a further plurality of mismatch values by performing an XOR operation of the plurality of mismatch values with the further plurality of mismatch values.

According to one embodiment, the circuit is configured to determine, for each of the one or more further pluralities of mismatch values, the number transistor circuits for which the mismatch value of plurality of mismatch values is different from the mismatch value of the further plurality of mismatch values and to determine the temperature value based on the number.

Figure 2:
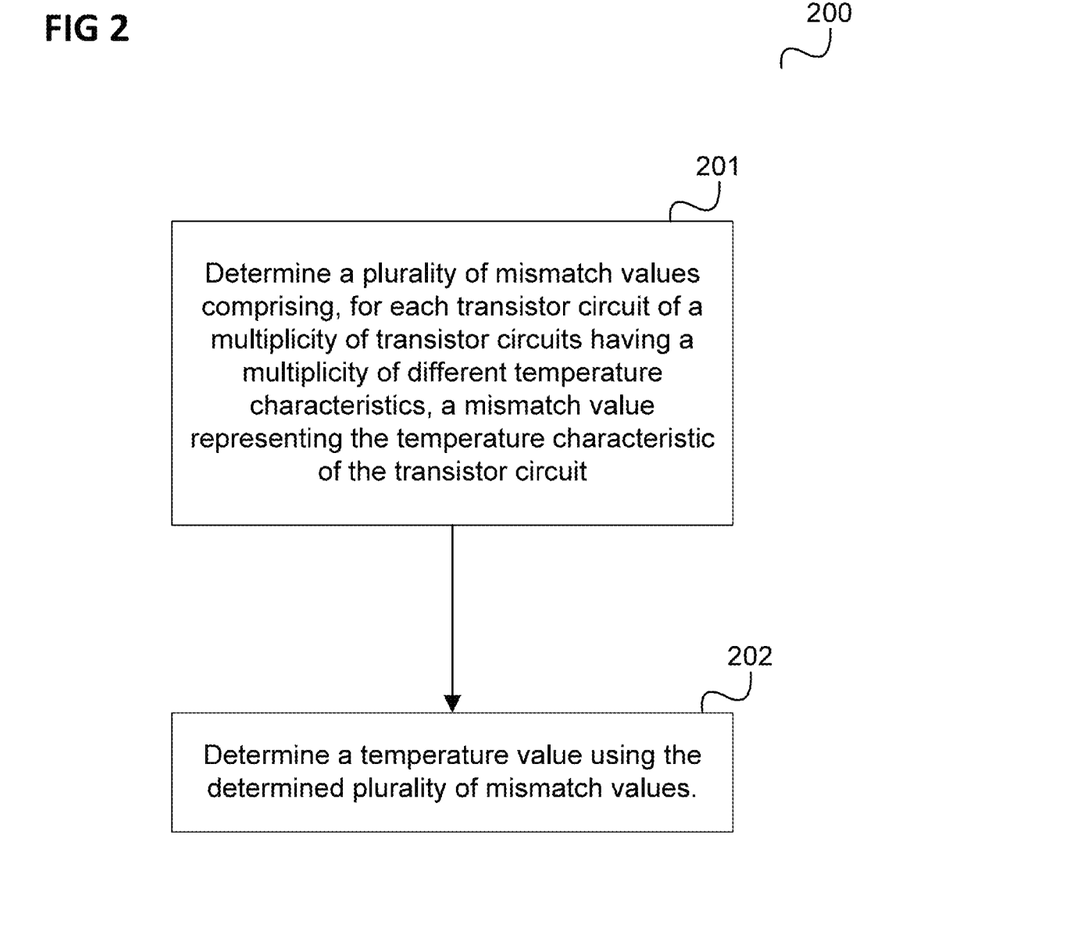
FIG. 2 shows a flow diagram according to an embodiment.

In one embodiment, a method as illustrated in FIG. 2 is for example carried out.

FIG. 2 shows a flow diagram 200 according to an embodiment.

The flow diagram 200 illustrates a method for sensing a temperature.

In 201, a plurality of mismatch values are determined including, for each transistor circuit of a multiplicity of transistor circuits having a multiplicity of different temperature characteristics, a mismatch value representing the temperature characteristic of the transistor circuit.

In 202, a temperature value is determined using the determined plurality of mismatch values.

It should be noted that embodiments described in context of the temperature sensing circuit 100 are analogously valid for the method illustrated in FIG. 2 and vice versa.

In the following, embodiments of the temperature sensing circuit 100 and for the method illustrated in FIG. 2 are described in more detail.

Figure 3:
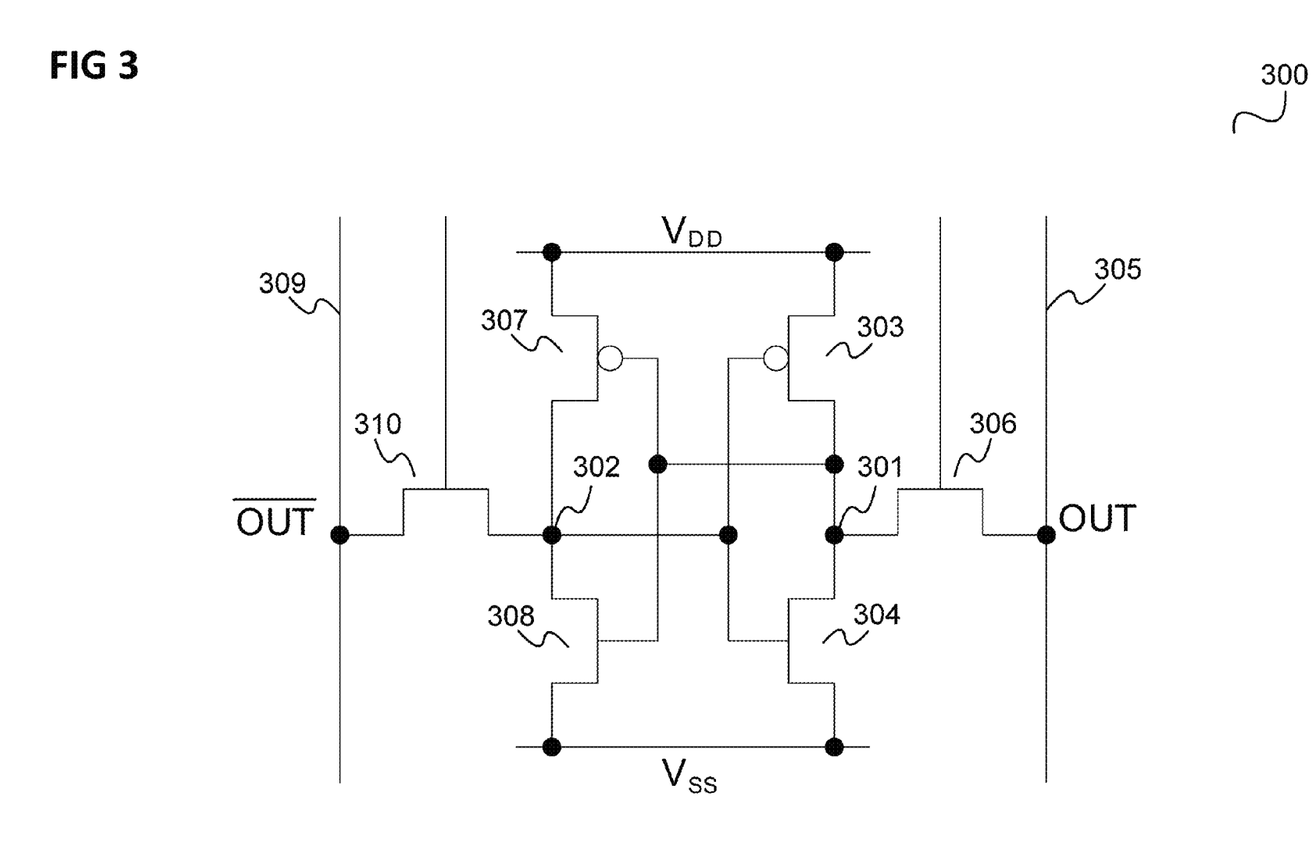
FIG. 3 shows an SRAM cell.

The transistor circuits are for example bi-stable SRAM cells as illustrated in FIG. 3.

FIG. 3 shows an SRAM cell 300.

The SRAM cell 300 includes a first node 301 whose state (high or low) is the state of the SRAM cell. The SRAM cell 300 includes a second node 302 whose state is the inverted state of the state of the first node 301.

The first node 301 is connected to the high supply potential (VDD) via a first p channel field effect transistor 303, to the low supply potential (VSS) via a first n channel field effect transistor 304 and to an output line 305 (e.g. a bit line) via a second n channel field effect transistor 306. The gates of the first p channel field effect transistor 303 and the first n channel field effect transistor 304 are coupled to the second node 302. The gate of the second n channel field effect transistor 306 is coupled to a control line (e.g. a word line).

The second node 303 is connected to the high supply potential (VDD) via a second p channel field effect transistor 307, to the low supply potential (VSS) via a third n channel field effect transistor 308 and to a complementary output line 309 (e.g. a bit line) via a fourth n channel field effect transistor 310. The gates of the second p channel field effect transistor 307 and the third n channel field effect transistor 308 are coupled to the first node 301. The gate of the fourth n channel field effect transistor 310 is coupled to the control line.

The startup value of the circuit, i.e. the state of the SRAM cell 300 when it is supplied with power, e.g. when VDD and VSS are connected to the SRAM cell 300, is defined by different mismatch parameters within the circuit's components. For temperature measurement, the circuit 300 may for example be designed such that the startup value depends mainly on the threshold voltages Vth of a transistor pair, e.g. the second and fourth n channel field effect transistors 304, 308.

Figure 4:
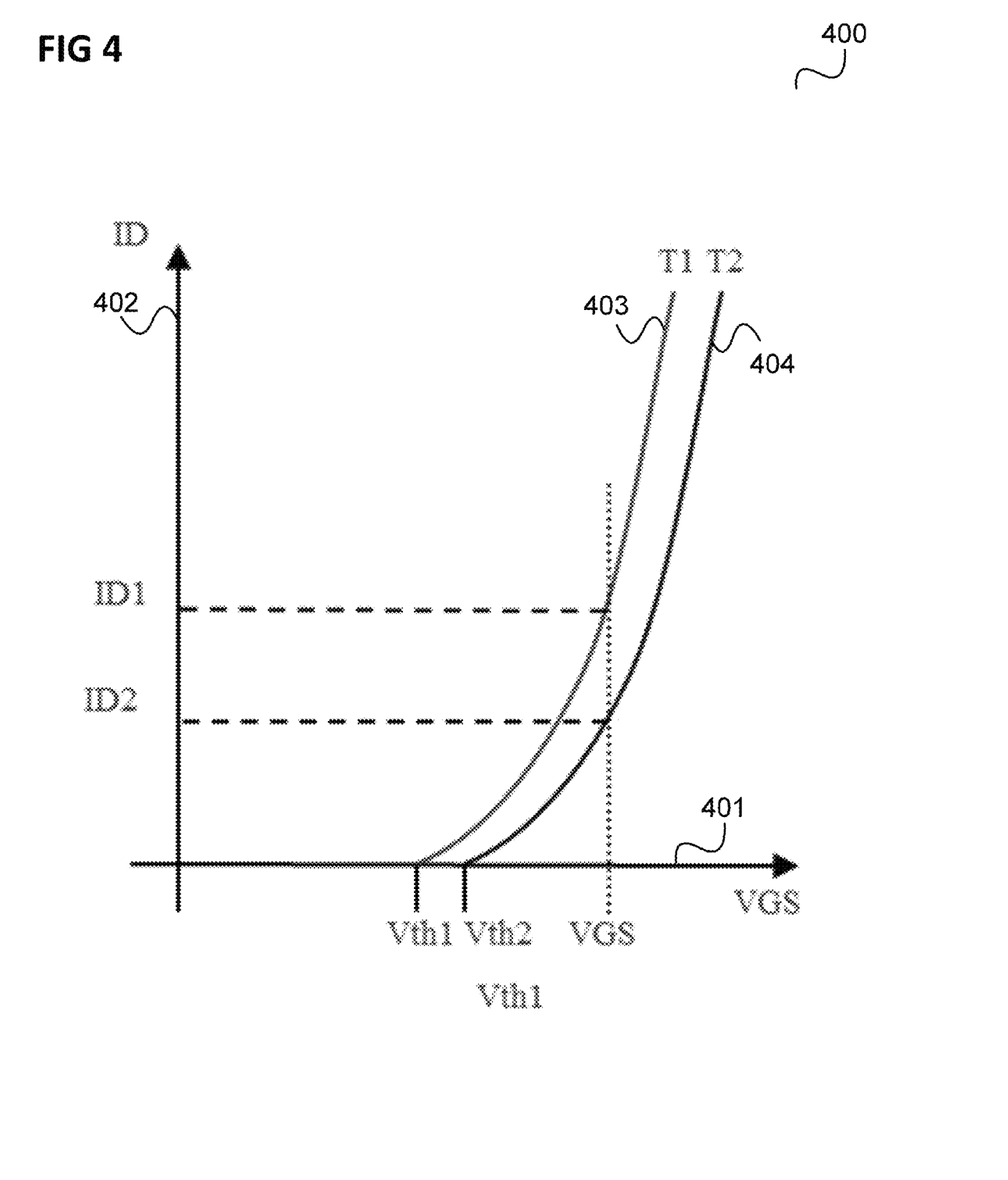
FIG. 4 shows a diagram illustrating the dependency of the drain current from the threshold voltage in a field effect transistor.

FIG. 4 shows a diagram 400 illustrating the dependency of the drain current from the threshold voltage.

In the diagram 400, the gate source voltage increases from left to right along a voltage axis 401 and the drain current increases from bottom to top along a current axis 402. Two curves 403, 404 show the dependency of the drain current on gate source voltage for different threshold voltages Vth1 and Vth2.

The difference of the threshold voltages of, for example, n channel field effect transistors 304, 308, can be seen to be or to depend on a mismatch parameter of the SRAM cell 300. The threshold voltage of a field effect transistor such as a MOSFET typically has a negative temperature coefficient. Measuring temperature by means of an SRAM cell according to one embodiment can be seen to be based on the fact that the temperature coefficient of different transistors is typically different. This is illustrated in FIG. 3.

FIG. 5 shows a diagram 500 illustrating the dependency of the threshold voltage for two transistors.

In the diagram 500, temperature increases from left to right along a temperature axis 501 and the threshold voltage increases from bottom to top along a voltage axis 502. A first curve 503 illustrates the threshold voltage Vth1 of a first transistor, e.g. first n channel field effect transistor 304, in dependence of temperature.

A second curve 504 illustrates the threshold voltage Vth2 of a second transistor, e.g. third n channel field effect transistor 308, in dependence of temperature.

As can be seen, the temperature coefficient of the threshold voltage for the first transistor KT1 is different from the temperature coefficient of the threshold voltage for the second transistor KT2 such that in this example the curves 503, 504 cross at a temperature 505.

The behavior illustrated in FIG. 5 may lead to an SRAM cell having different startup values at different temperatures. For example, with the example of FIG. 5 the SRAM cell 300 may have at 25° C. a different startup value than at 120° C. According to one embodiment, this is used for temperature measurement.

Depending on the required measurement accuracy a high number of SRAM cells may be used to get reliable results. One SRAM cell typically has a size of around 150 $F^2$ (wherein F is the minimum feature size of the technology used). This means at a 65 nm technology the size is around 10 $um^2$ per cell. If an array of 1000 cells is used the needed size is around 10000 $um^2$. Such an array of cells may be easily implemented since a low number of transistors are required per cell.

Figure 6:
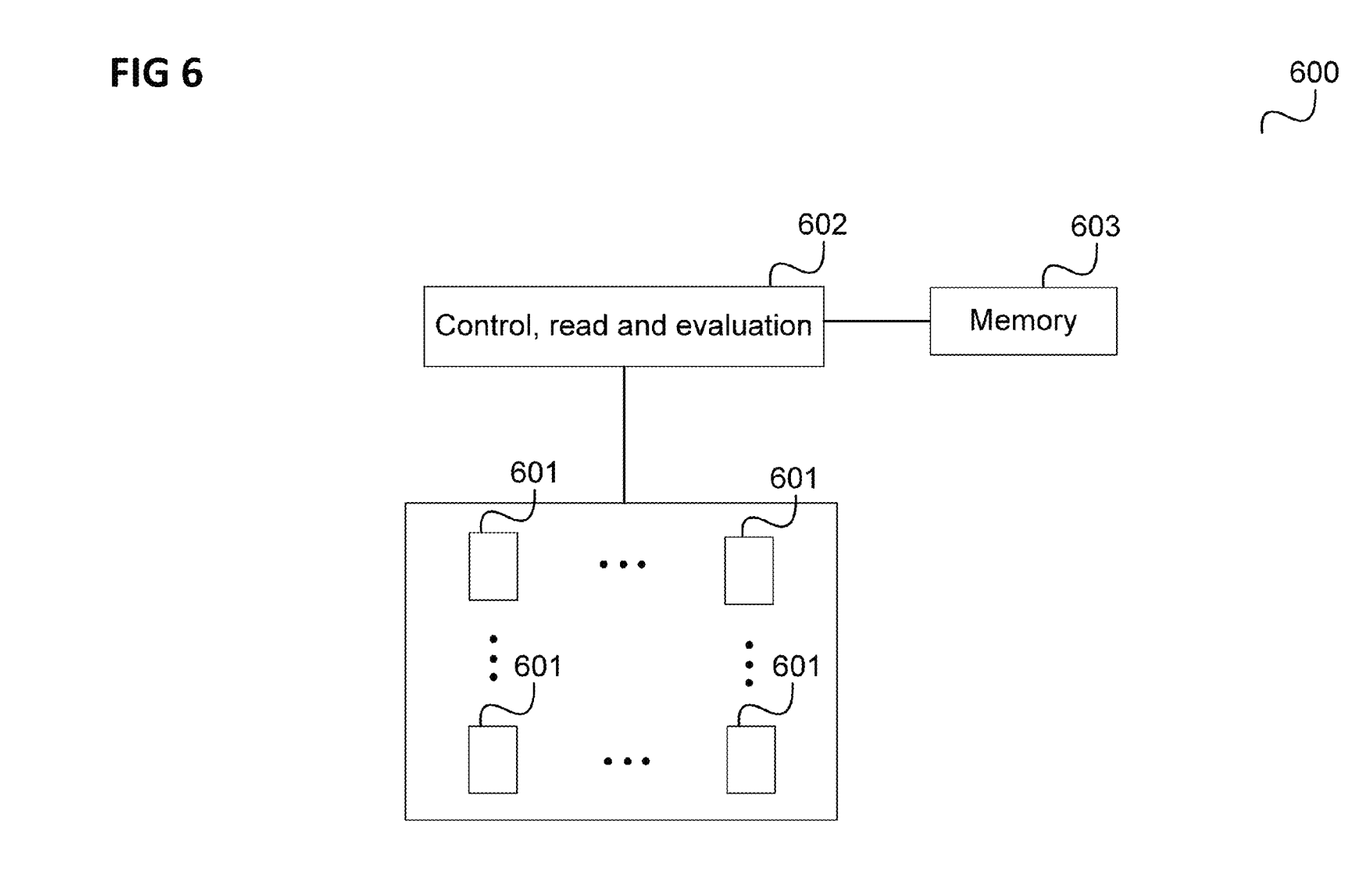
FIG. 6 shows a temperature sensing circuit according to an embodiment.

FIG. 6 shows a temperature sensing circuit 600 according to an embodiment.

The temperature sensing circuit 600 includes an array of transistor circuits 601. Each transistor circuit 601 has at least two transistors which have a certain mismatch in terms of temperature dependencies.

The temperature sensing circuit 600 further includes a control, read and evaluation circuit 602 and a memory 603 (e.g. the non-volatile memory, e.g. a flash memory, of a chip that includes the transistor sensing circuit 600). The control, read and evaluation circuit 602 may for example include circuitry for accessing the array of transistor circuits similar to the circuitry for accessing an array of memory (e.g. SRAM) cells (e.g. an address decoder etc.).

The transistor circuits 601 may be SRAM cells. Another example for an implementation of a transistor circuit 601 is given in FIG. 7.

Figure 7:
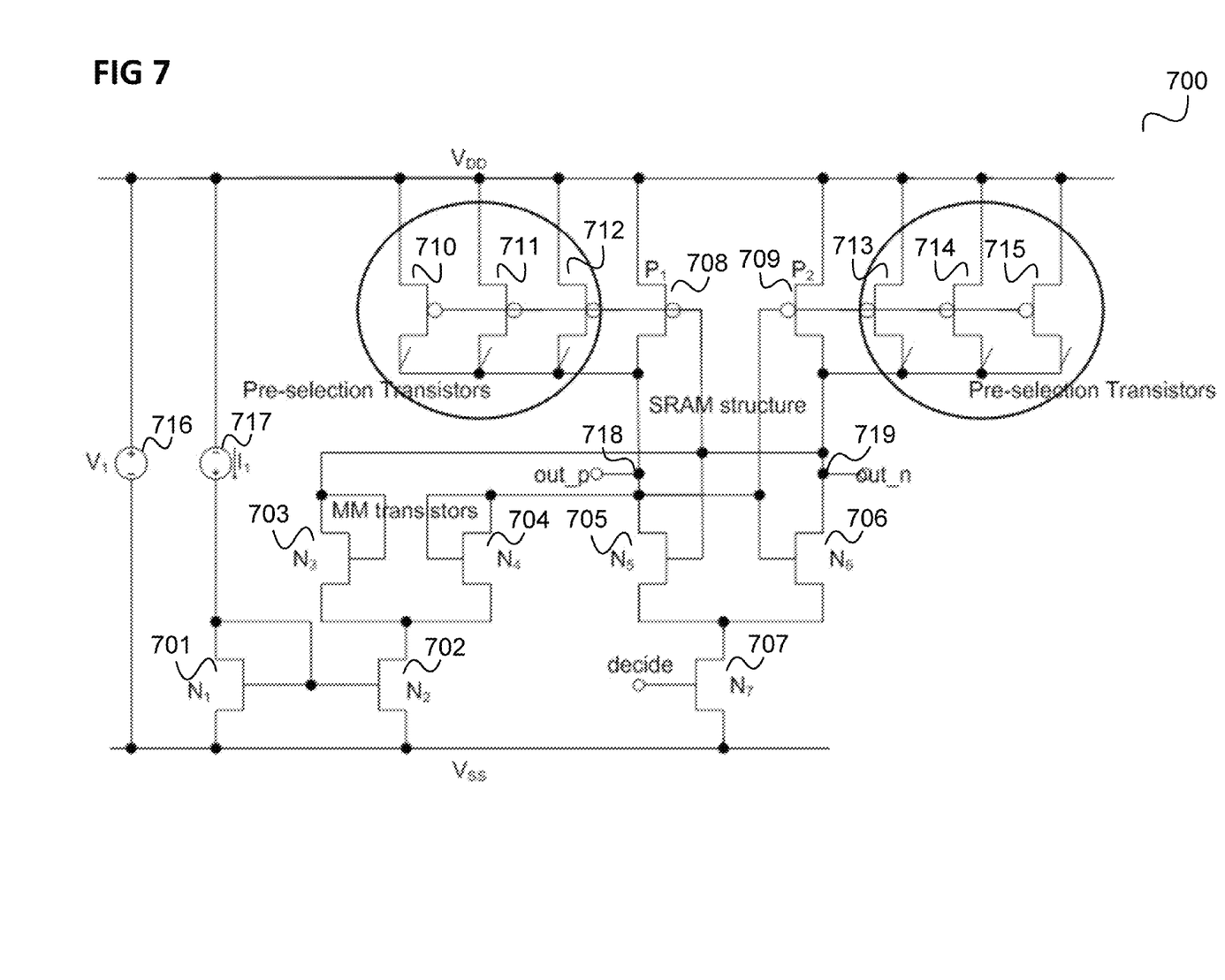
FIG. 7 shows a transistor circuit according to an embodiment.

FIG. 7 shows a transistor circuit 700 according to an embodiment.

The transistor circuit 700 includes seven n channel field effect transistors (e.g. n-MOSFETs) 701 to 707 and eight p channel field effect transistors (e.g. p-MOSFETs).

The third n channel field effect transistor (FET) 703 and the fourth n channel FET 704 are the mismatch transistors, i.e. the transistors whose mismatch (e.g. in terms of the temperature coefficient of the threshold voltage as explained above) is used for determining the temperature.

The drain terminal of the third n channel FET 703 is connected to its gate terminal. Similarly, the drain terminal of the fourth n channel FET 704 is connected to its gate terminal The source terminals of the third n channel FET 703 and the fourth n channel FET 704 are connected to the drain terminal of the second n channel FET 702.

The first n channel FET 701 and the second n channel FET 702 form a current mirror. Accordingly, their gate terminals are connected to each other and to the drain terminal of the first n channel FET 701. Their source terminals are connected to the low supply potential (VSS) which is provided, along with the high supply potential (VDD) by a voltage source 716.

The drain terminal of the first n channel FET 701 is connected to VDD via a current source 717.

The fifth n channel FET 705, the sixth n channel FET 706, the first p channel FET 708 and the second p channel FET 709 form an SRAM cell structure as explained above with reference to FIG. 3, wherein the source terminals of the n channel FETs 705, 706 are connected to VSS via the seventh n channel FET 707 which is controlled via its gate via a decide signal and wherein output terminals out_p and out_n correspond to the connections to the output and complementary output line (e.g. via n channel FETs as in FIG. 3). The value of the node 718 at which the first p channel transistor 708 is connected to the fifth n channel transistor 705 is what is referred to as the value of the transistor circuit 700 in the following. The value of the node 719 at which the second p channel transistor 709 is connected to the sixth n channel transistor has the complementary value.

The gates of the third p channel FET 710, the fourth p channel FET 711 and the fifth p channel FET 712 are connected to the gate of the first p channel FET 708. Their drain terminals are connected to the drain of the first p channel FET 708 and their source terminals are connected to VDD. In other words, they are arranged in parallel to the first p channel FET 708.

The gates of the sixth p channel FET 713, the seventh p channel FET 714 and the eighth p channel FET 715 are connected to the gate of the second p channel FET 709. Their drain terminals are connected to the drain of the second p channel FET 709 and their source terminals are connected to VDD. In other words, they are arranged in parallel to the second p channel FET 709.

Figure 8:
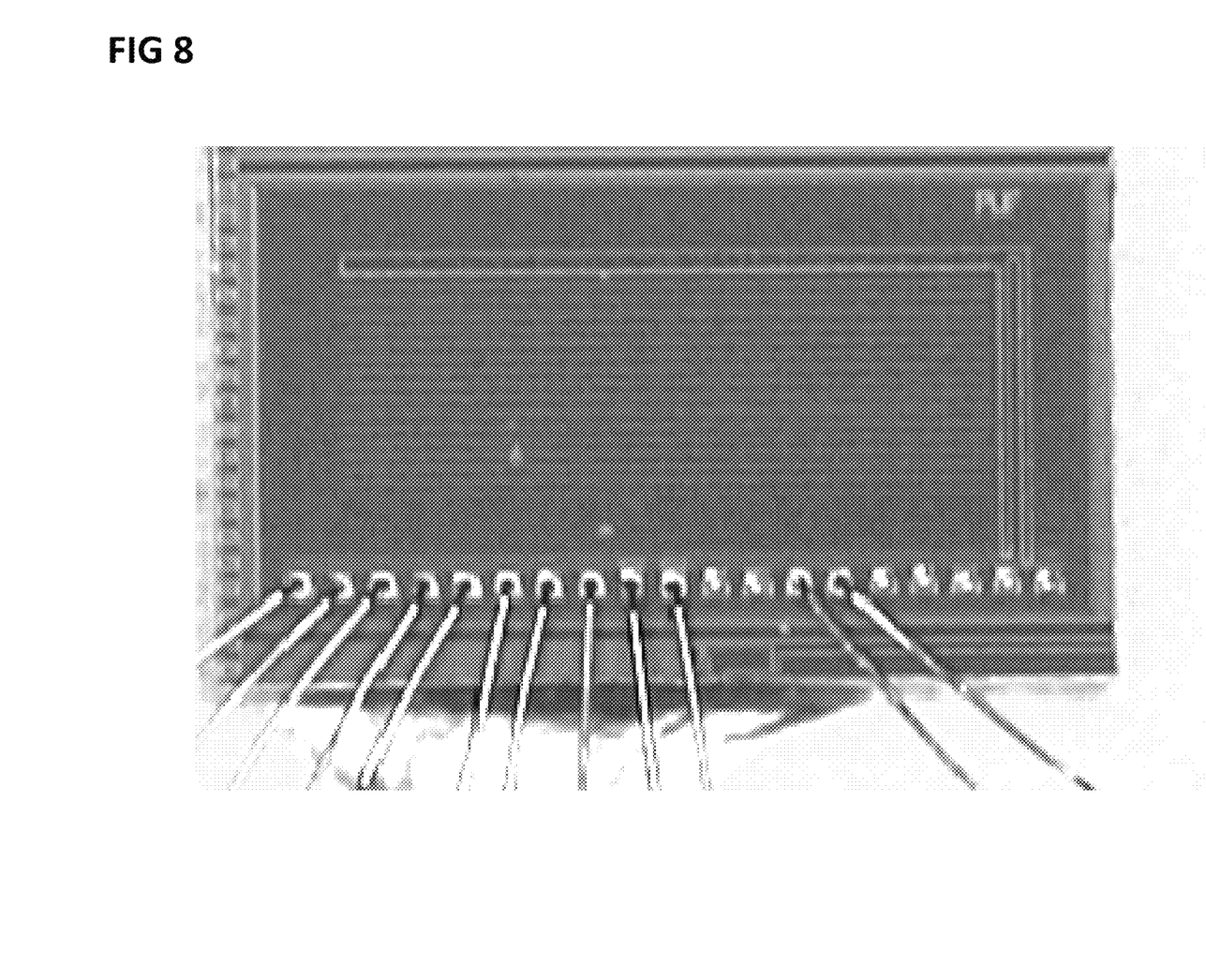
FIG. 8 shows a micrograph of a chip including an array of transistor circuits as illustrated in FIG. 7.

FIG. 8 shows a micrograph of a chip including an array of transistor circuits as illustrated in FIG. 7.

As mentioned above, the third n channel FET 703 and the fourth n channel FET 704 are the mismatch transistors. They are for example designed to generate output values (at their drain terminals) which depend on their threshold voltages.

The fifth n channel FET 705, the sixth n channel FET 706, the first p channel FET 708 and the second p channel FET 709 can be seen to form a comparator. When the seventh field effect transistor 707 is switched on by the decide signal these transistors settle to a stable output (1 or 0 at one output terminal and the complementary value at the other output terminal). The comparator can be shared between different mismatch transistors to reduce the size.

It should be noted that to achieve a change of the output value when the temperature varies, the mismatch transistors may be chosen to have a similar threshold voltage. By selectively connecting the third to eighth n channel FETs 710 to 715, which can be seen as pre-selection transistors, in parallel to the first p channel FET and the second p channel FET, in effect, the sizes of the p channel FETs of the SRAM cell structure can be varied such that the transistor circuit 700 can be used as a plurality of transistor circuits. For example, the sizes of the third to eighth n channel FETs 710 to 715 can be chosen such that they allow selecting one of 15 possible values for the size of each the p channel FETs of the SRAM cell structure. For example, the sizes are chosen to allow a binary representation of one of 15 possible sizes, e.g. by choosing the size of the fourth n channel FET 711 to be double the size of the third n channel FET 710 and half the size of the fourth n channel FET 712. Thus, if there should be 1000 bits (i.e. start values) for a certain value 1000/15=67 transistor circuits (and thus transistor pairs) plus the circuit 602 (e.g. including a sense amplifier and an address decoder) are needed. An estimated value for the size of the resulting temperature sensing circuit is 2000 um² for an 65 nm technology.

In the following, an example for a processing flow for a temperature measurement by the temperature sensing circuit is given.

Figure 9:
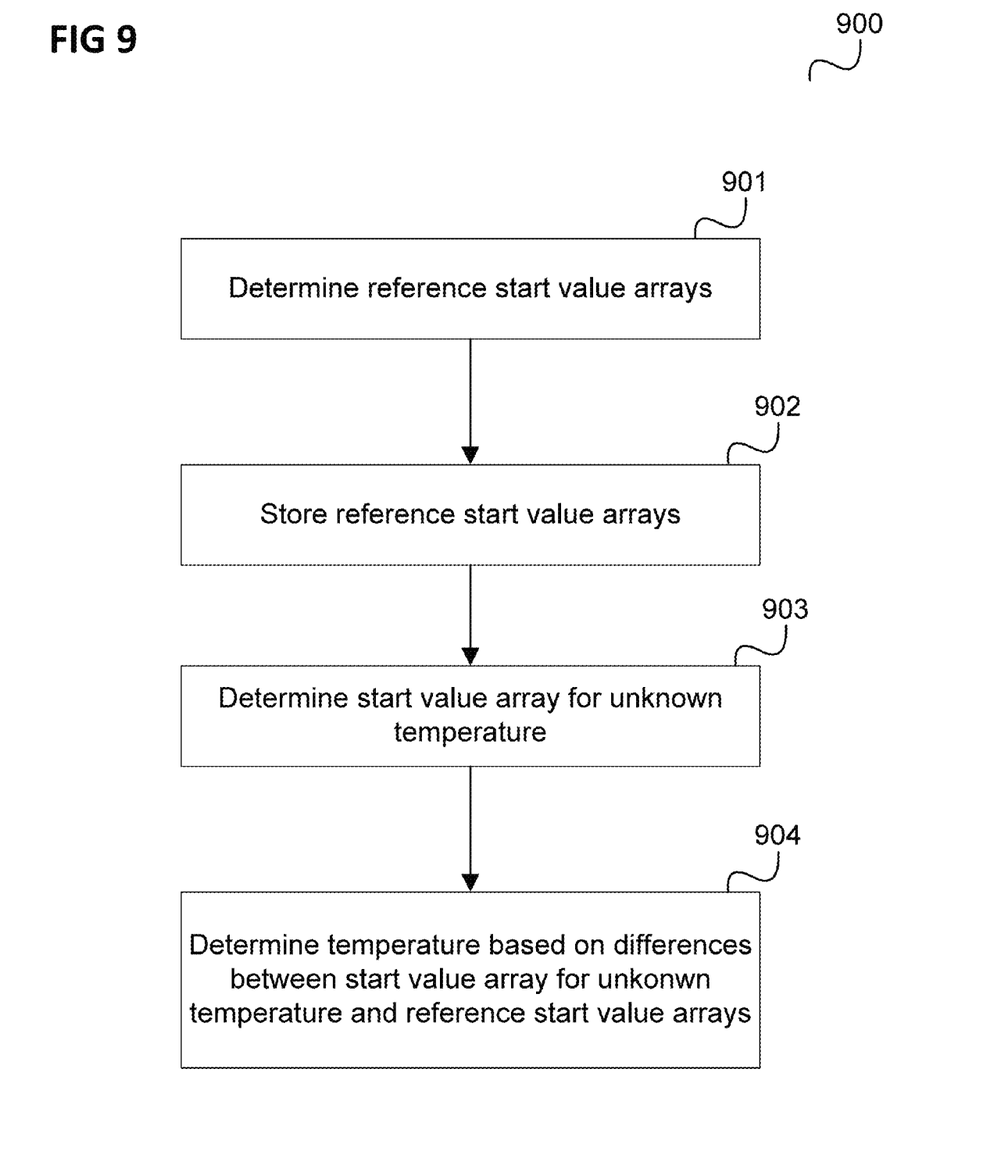
FIG. 9 shows a flow diagram for sensing temperature.

FIG. 9 shows a flow diagram 900.

Figure 10:
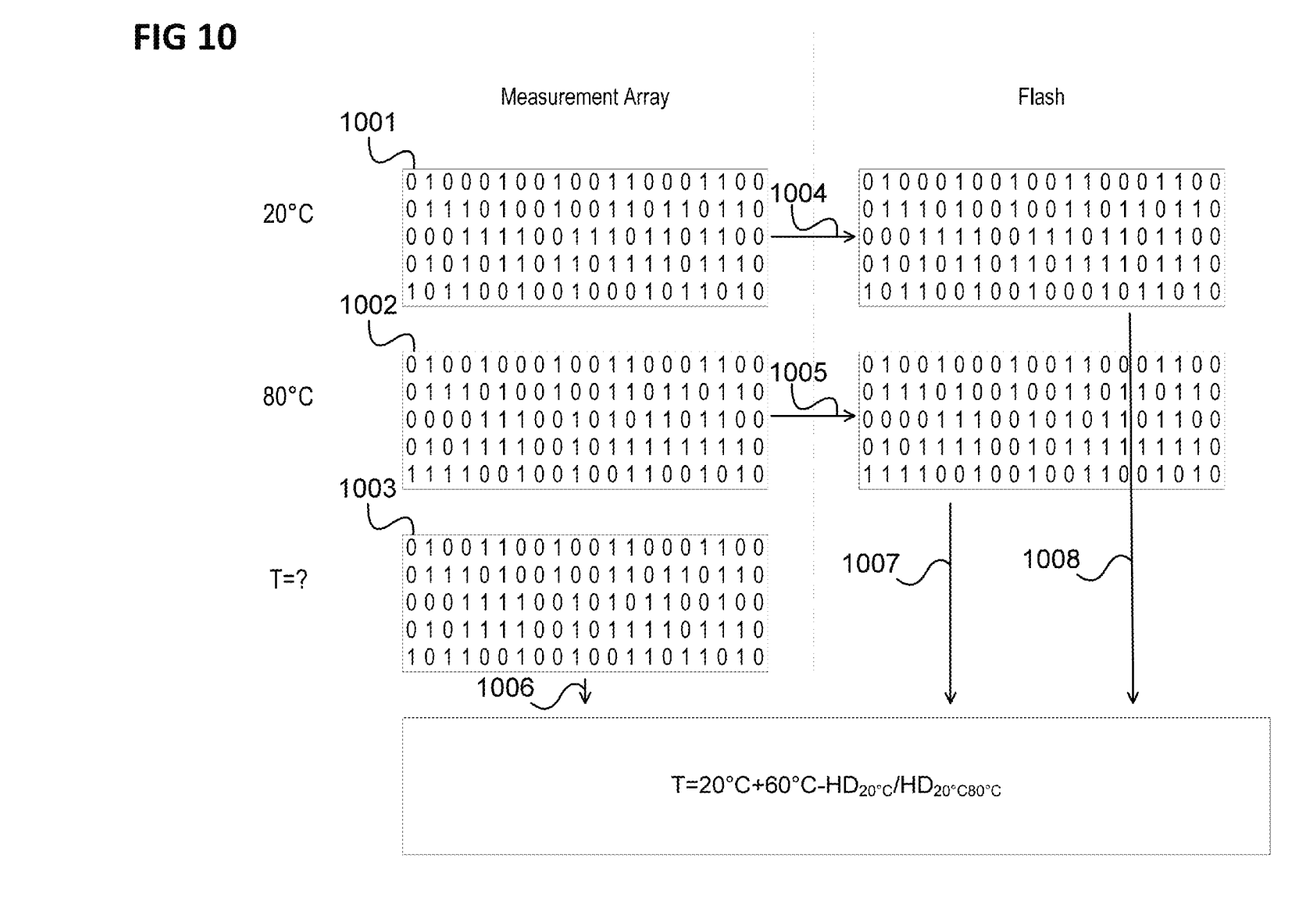
FIG. 10 illustrates arrays of start values.

In 901, the control, read and evaluation circuit 602 determines, for each transistor circuit of the array of transistor circuits 601 the start values of the transistor circuits 601 at a first temperature (e.g. 20° C.) and at a second temperature (e.g. 80° C.) and thus an array of start values for the first temperature and an array of start values for the second temperature as illustrated in FIG. 10.

FIG. 10 illustrates arrays of start values 1001, 1002, 1003.

In 902, as illustrated by arrows 1004 and 1005 in FIG. 10, the circuit 602 stores the array of start values for the first temperature 1001 and the array of start values for the second temperature 1002 in the memory 603.

For measuring the temperature, the circuit 602 can be seen to exploit the fact that at similar temperatures, the array of start values are also similar while at largely different temperatures, the arrays of start values are also largely different. This effect is illustrated by FIGS. 11 and 12.

Figure 11:
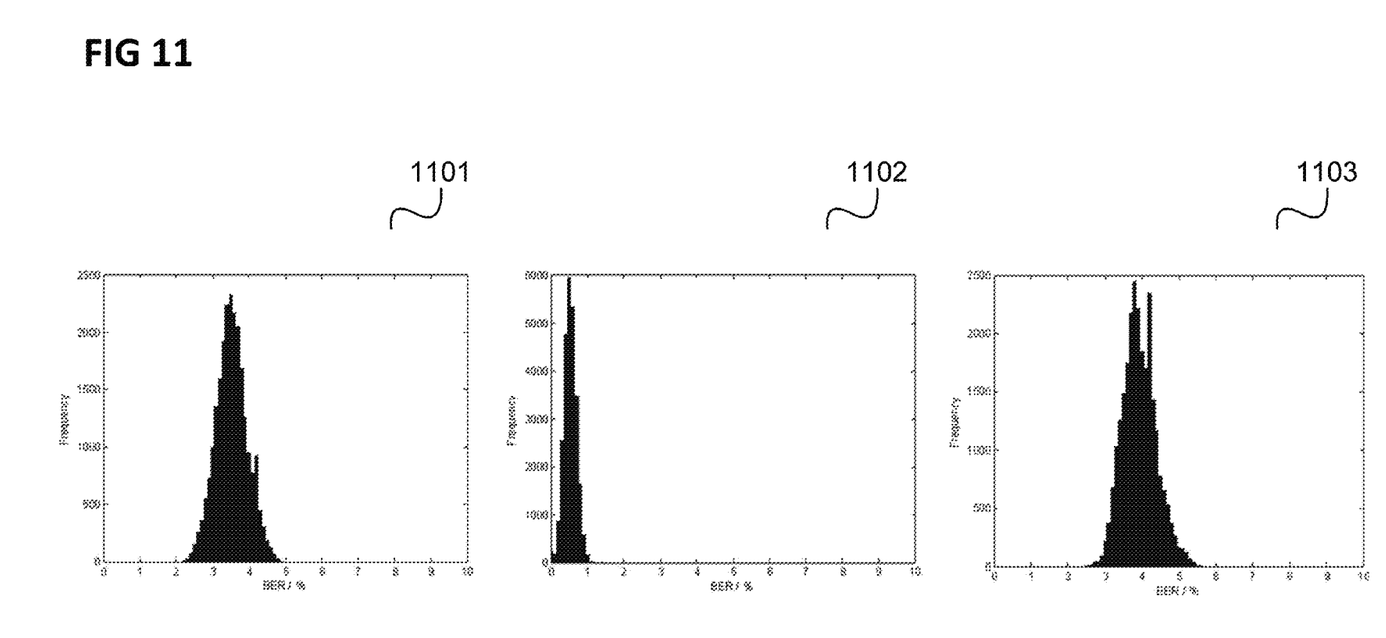
FIG. 11 shows histograms that show the difference of re-measurements of the array of start values to an initial measurement.

FIG. 11 shows histograms 1101, 1102, 1103 that show the difference of re-measurements (i.e. re-determination) of the array of start values (in terms of bit error rate BER) to an initial measurement at 20° C. The left histogram 1101 shows the results for a measurement at −40° C. The middle histogram 1102 shows the results for a re-measurement at 20° C. and the right histogram 1103 shows the result of a measurement of 130° C. are shown. As can be seen the distance to the initial vector is strongly dependent on the temperature.

Figure 12:
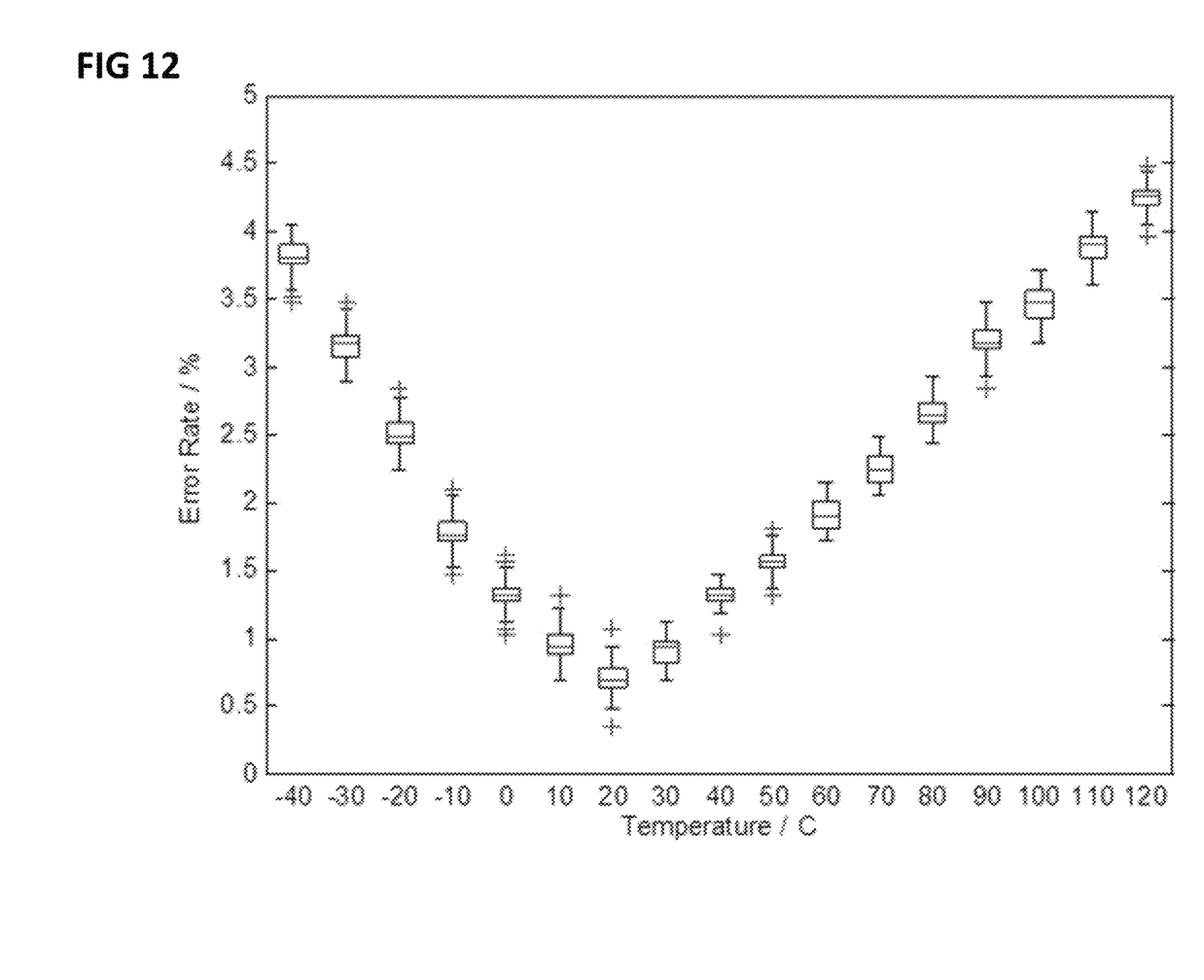
FIG. 12 shows the error rate with respect to the initial measurement depending on temperature.

FIG. 12 shows the error rate depending on temperature.

It can be seen that the error rate where the initial vector has be taken (at 20° C.) is smallest.

For determining the array of start values, the circuit 602 for example briefly unpowers the transistor circuits, e.g. by disconnecting VDD, or briefly sets the output nodes, in case of the transistor circuits as shown in FIG. 7 the nodes 718, 719, to the same potential and, when this has been done (i.e. when the transistor circuits are repowered or the nodes 718, 719 are no longer set to the same potential), determines the values of the transistor circuits. For the unpowering of the transistor circuits 601 or the setting of nodes 718, 719 to the same potential a common switch for the whole array of transistor circuits 601 may for example be provided.

In 903, at the control, read and evaluation circuit 602 determines the array of start values for an unknown temperature 1003.

In 904, the circuit 602 calculates the unknown temperature T, using the start value arrays 1001, 1002, 1003 (as illustrated by arrows 1006, 1007, 1008) for example using the formula $$T = 20° \text{ C.} + 60° \text{ C.} \frac{HD_{20° C.}}{HD_{20° C. 80° C.}}$$

wherein $HD_{20° C.}$ is the difference between the array of start values for the unknown temperature 1003 and the array of start values for the first temperature (20° C.), e.g. the number of start values in which these two arrays differ.

Similarly, $HD_{20° C. 80° C.}$ is the difference between the array of start values for the second temperature (80° C.) and the array of start values for the first temperature.

It should be noted that the above formula is written for temperatures above 20° C. and that it neglects noise. These issues may be taken into account by determining $$\Delta T = 60° \text{ C.} \frac{(HD_{20° C.} - HD_{Noise})}{HD_{20° C. 80° C.}}$$

and setting T according to
if $HD_{80° C.} < HD_{20° C. 80° C.}$.
then T=20° C.+ΔT
else T=20° C.−ΔT.

Here, $HD_{Noise}$ is for example the difference between the array of start values if remeasured for the first temperature to the array of start values for the first temperature.

The above formula assumes that the difference between the array of start values for the unknown temperature and the reference arrays of start values (i.e. the arrays of start values for the first temperature and for the second temperature) linearly depends from the temperature. To increase accuracy, higher order temperature coefficients may be determined by determining the array of start values for one or more additional temperatures to determine a non-linear relation between temperature and the number of differences in the array of start values.

Figure 13:
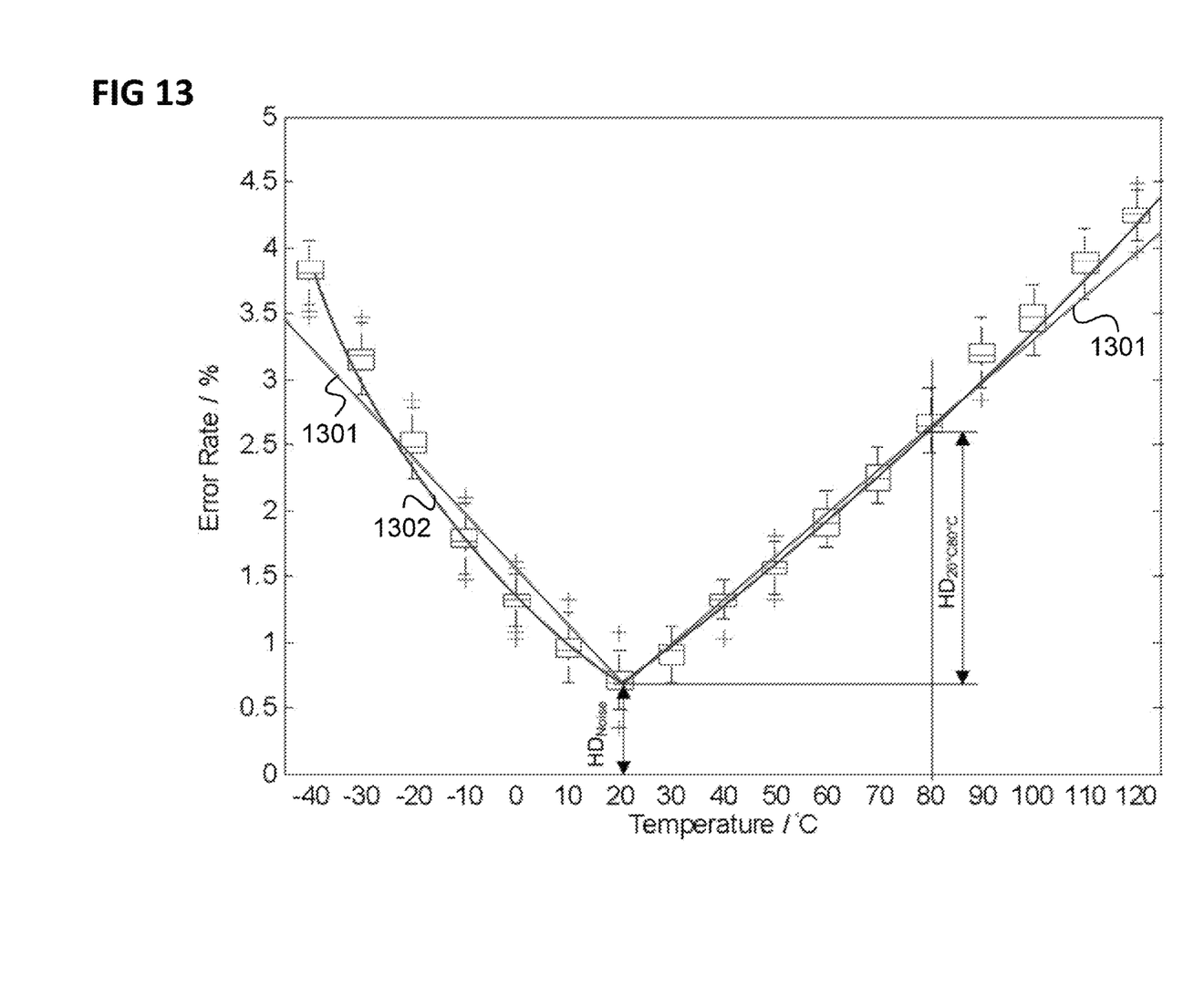
FIG. 13 illustrates a first order compensation in the temperature determination.

FIG. 13 illustrates a first order compensation in the temperature determination.

Two straight lines 1301 illustrate the assumption of a linear dependency of the number of differences in the start values from temperature.

A curve 1302 illustrates a higher order model, wherein a nonlinear dependency of the number of differences in the start values from temperature has been determined which may be used for calculation of an unknown temperature from an array of start values.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A temperature sensing circuit comprising:
    a multiplicity of transistor circuits having a multiplicity of different temperature characteristics; and
    a circuit configured to determine a plurality of mismatch values comprising, for each transistor circuit, a mismatch value representing the temperature characteristic of the transistor circuit and to determine a temperature value using the determined plurality of mismatch values.

2. The temperature sensing circuit of claim 1, wherein the temperature characteristic of a transistor circuit is the dependency of a start state of the transistor circuit from temperature.

3. The temperature sensing circuit of claim 1, wherein the mismatch value of a transistor circuit is a start state of the transistor circuit.

4. The temperature sensing circuit of claim 1, wherein each mismatch value is a digital value.

5. The temperature sensing circuit of claim 1, wherein each mismatch value is 0 or 1.

6. The temperature sensing circuit of claim 1, comprising a memory storing one or more further pluralities of mismatch values, wherein each plurality of mismatch values comprises, for each transistor circuit, a mismatch value representing a temperature characteristic of the transistor circuit wherein the circuit is configured to determine the temperature value using the one or more further pluralities of mismatch values.

7. The temperature sensing circuit of claim 1, comprising a memory storing one or more further pluralities of mismatch values, wherein each further plurality of mismatch values corresponds to a predetermined temperature and each further plurality of mismatch values comprises, for each transistor circuit, a start state of the transistor circuit at the temperature to which the further plurality of mismatch values corresponds wherein the circuit is configured to determine the temperature value using the one or more further pluralities of mismatch values.

8. The temperature sensing circuit of claim 1, wherein the circuit is configured to determine, for each of the one or more further pluralities of mismatch values, the number transistor circuits for which the mismatch value of plurality of mismatch values is different from the mismatch value of the further plurality of mismatch values and to determine the temperature value based on the number.

9. The temperature sensing circuit of claim 1, wherein at least one of the multiplicity of transistor circuits comprises a bi-stable transistor circuit.

10. The temperature sensing circuit of claim 9, wherein at least one of the multiplicity of transistor circuits comprises a static random access memory cell.

11. The temperature sensing circuit of claim 1, wherein the circuit is configured to determine the temperature value by comparing the plurality of mismatch values with the one or more further pluralities of mismatch values.

12. The temperature sensing circuit of claim 11, wherein each mismatch value is 0 or 1 and the circuit is configured to compare the plurality of mismatch values with a further plurality of mismatch values by performing an XOR operation of the plurality of mismatch values with the further plurality of mismatch values.

13. The temperature sensing circuit of claim 1, wherein each transistor circuit comprises two transistors and the mismatch value for the transistor circuit represents a mismatch of the temperature dependency of the transistors.

14. The temperature sensing circuit of claim 13, wherein at least one transistor circuit of the multiplicity of transistor circuits has transistors whose temperature dependencies cross each other.

15. The temperature sensing circuit of claim 13, wherein the transistors are field effect transistors.

16. The temperature sensing circuit of claim 15, wherein the temperature dependency of a transistor is the dependency of the threshold voltage of the transistors from temperature.

17. The temperature sensing circuit of claim 13,
    wherein at least one transistor circuit of the multiplicity of transistor circuits comprises a main transistor circuit having an operating point and at least one additional transistor switchably connectable to the main transistor circuit, which is configured to move the operating point when connected to the main transistor circuit, to thereby increase the probability of providing a crossing point of the temperature dependencies of the transistors of the transistor circuit.

18. The temperature sensing circuit of claim 17,
    wherein the at least one additional transistor is switchably connectable in parallel to the main transistor circuit.

19. A method for sensing temperature comprising:
    determining a plurality of mismatch values comprising, for each transistor circuit of a multiplicity of transistor circuits having a multiplicity of different temperature characteristics, a mismatch value representing the temperature characteristic of the transistor circuit; and
    determining a temperature value using the determined plurality of mismatch values.

* * * * *